(12) United States Patent
Lu

(10) Patent No.: US 10,174,179 B2
(45) Date of Patent: Jan. 8, 2019

(54) DURABLE, WATER RESISTANT WOOD AND WOOD COMPOSITES

(71) Applicant: Ziqiang Lu, Red Wing, MN (US)

(72) Inventor: Ziqiang Lu, Red Wing, MN (US)

( * ) Notice: Subject to any disclaimer, the term of this patent is extended or adjusted under 35 U.S.C. 154(b) by 226 days.

(21) Appl. No.: 14/523,055

(22) Filed: Oct. 24, 2014

(65) Prior Publication Data

US 2016/0115337 A1    Apr. 28, 2016

(51) Int. Cl.
*C08K 3/04* (2006.01)
*C09D 15/00* (2006.01)

(52) U.S. Cl.
CPC ............... *C08K 3/04* (2013.01); *C09D 15/00* (2013.01); *B05D 2203/20* (2013.01); *C08K 2003/045* (2013.01)

(58) Field of Classification Search
None
See application file for complete search history.

(56) References Cited

U.S. PATENT DOCUMENTS

| | | | | |
|---|---|---|---|---|
| 5,190,997 | A * | 3/1993 | Lindemann | C08F 257/02 524/44 |
| 6,569,540 | B1 * | 5/2003 | Preston | B27N 1/006 428/537.1 |
| 2007/0117927 | A1 * | 5/2007 | Han | C08J 9/30 525/192 |
| 2010/0068543 | A1 * | 3/2010 | Hayward | C08H 8/00 428/511 |
| 2011/0021098 | A1 * | 1/2011 | Tabellion | C03C 17/007 442/80 |
| 2013/0313857 | A1 * | 11/2013 | Lu | B62D 25/2054 296/184.1 |

* cited by examiner

*Primary Examiner* — Chinessa T. Golden
(74) *Attorney, Agent, or Firm* — Vidas, Arrett & Steinkraus, P.A.

(57) ABSTRACT

The invention provides a novel product and method to coat wood and wood composite products and improves their durability and service life in outdoor conditions. The method comprises coating a Type I waterborne adhesive, crosslinking polyvinyl acetate (XPVAc or x-PVAc), on wood and applying sufficient heat to dry and cure the coating to form a durable bond on wood or wood composites. The above paint system consists of at least two coating layers, in which both layers are crosslinking polyvinyl acetate coating. Alternatively, crosslinking polyvinyl acetate can be used as a primer, while the second or the third layer uses an acrylic, alkyd, or other water resistant coating. This coating approach results in a durable wood or wood composite product due to the excellent bonding with the wood substrate and the excellent water blocking by crosslinking polyvinyl acetate.

23 Claims, 1 Drawing Sheet

Flow chart of the coating processes for crosslinking polyvinyl acetate-coated wood and wood composites.

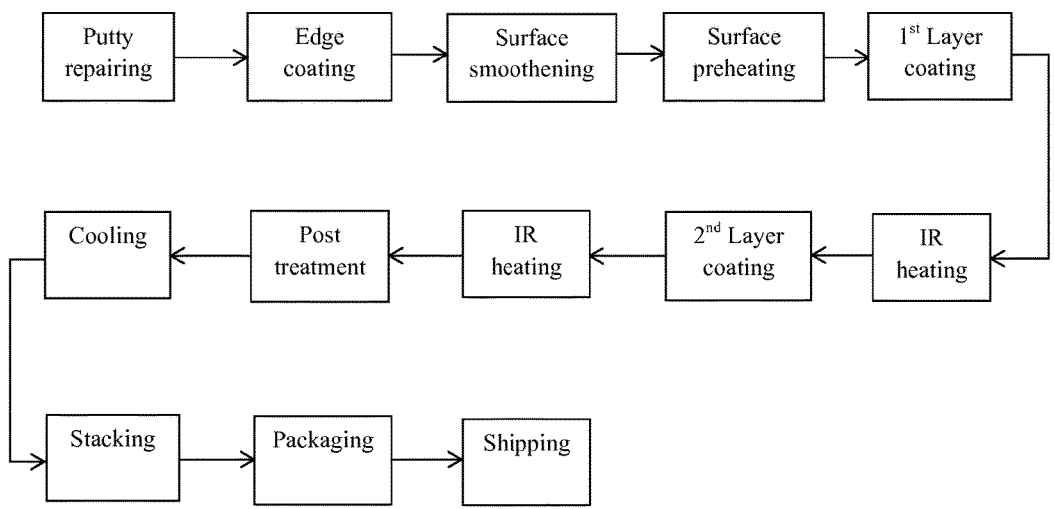
Flow chart of the coating processes for crosslinking polyvinyl acetate-coated wood and wood composites.

DURABLE, WATER RESISTANT WOOD AND WOOD COMPOSITES

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Wood is a natural, sustainable material. Wood has long been used as a building material by human beings. Different from solid wood lumber, wood composites use small wood units such as veneer, chips, fibers, flakes and particles that can be used in the manufacture of large panel materials to meet customer's requirements. They are also flexible in dimensions compared to solid lumber, which is limited by the diameter and shape of wood logs. Due to the development and use of synthetic wood adhesives in the early 1940s, the durability of wood composites has significantly improved.

Since wood is a hygroscopic material, it absorbs water or moisture through its vessel elements, fiber tracheids, and other cavities existing in the microstructure. In addition, wood can swell and shrink due to the movement of water or moisture in its cells and cavities by the capillary action in a natural atmosphere. These defects are harmful to strength properties and durability of wood and wood composites. For example, an oriented strand board (OSB) bonded with a Type I adhesive such as phenol formaldehyde (PF) has an improved water resistance, but it is easily swollen and even delaminated into layers across the board thickness within a certain period of outdoor exposure. Furthermore, wood is subject to the attack of fungi and other biodeterioration agents in wet conditions.

For better outdoor services, wood and wood composites are normally covered with a coating material. The most common coatings for wood and wood composites include latex, acrylic, alkyd, and urethane coatings. Latex is usually a vinyl acetate (VAc)-based paint, in which acrylic can be added as a copolymer to improve the wearing and sunlight resistances of latex. VAc is a very good binder to most substrates, easily mixed with various additives (e.g., pigments) and is lower in cost. However, it is poor in water resistance and not very durable. Acrylic coating uses acrylic polymers as the primary component. It is good in water and wearing resistances. Latex and acrylic both are normally waterborne paints. Acrylic polymers can also be emulsified as emulsion paint. Alkyd and urethane coatings are normally oil-based paints and made from polyester and polyurethane, respectively. Among these coatings, latex is lower in cost than acrylic, alkyd, and urethane coatings.

Both latex and acrylic coatings can be quickly dried out within a couple of hours at room conditions, while the alkyd and urethane paintings usually take one or more days to be completely cured. In addition, the alkyd painting is brittle and may turn yellow later if the coated wood is stored in a dark place. Although the above coatings have a good bond to wood, they need to be repainted every 2 to 4 years to repair cracking, chipping, and peeling during outdoor exposure.

Polyvinyl acetate (PVAc) is a thermoplastic polymer, which is made from free radical polymerization of the monomer vinyl acetate (VAc) under an initiator. PVAc is normally available as an emulsion adhesive that includes polymerized vinyl acetate. The emulsion may also include some fraction of monomers such as VAc and butyl acetate (BAc) and a copolymer such as polyvinyl alcohol (PVA) and ethylene vinyl acetate (EVA) (EVA is mostly used as a copolymer of PVAc for coating, book binding, and other applications). These ingredients are further blended with water, a biocide or preservative, and the like. In order to maintain a good emulsion stability of polyvinyl acetate, a nonionic or anionic surfactant may also be added.

For crosslinking polyvinyl acetate (XPVAc, or x-PVAc), a crosslinking agent or crosslinker (also called an adhesive modifier) is usually added into the resin emulsion. The crosslinking mechanism of XPVAc at the wood-adhesive interface is not yet fully understood. By the initiation of an acidic catalyst, the crosslinking agent may react with PVAc, PVA and lingocellulose to form a crosslinking structure at the interface. Additionally, the free hydroxyl groups (—OH) of PVA and lignocellulose and acetate groups (—OOCCH$_3$) of PVAc may form hydrogen bonds together. Moreover, there may exist a mechanical interlocking among the crosslinked/uncrosslinked molecular chains of PVAc and PVA, thus resulting in a complex network structure at the interface which significantly improves the water resistance of XPVAc.

XPVAc has been used as a wood adhesive in the wood industry due to its improved water resistance and excellent bonding to wood. Another advantage of XPVAc to the wood industry is that it emits no formaldehyde during service. In contrast, formaldehyde emission has been plaguing the wood industry, which extensively uses formaldehyde-based synthetic adhesives such as urea formaldehyde (UF), melamine urea formaldehyde (MUF), melamine formaldehyde (MF), PF, resorcinol formaldehyde (RF), phenol resorcinol formaldehyde (PRF) adhesives, and the like. However, XPVAc has never been used as a coating material for wood and wood composites because people always use and treat it as a wood adhesive. It would be desirable to find a means of simply applying a durable and water-resistant coating system on wood and wood composites to ensure a longer service life for them in outdoor applications.

BRIEF SUMMARY OF THE INVENTION

For this invention, a Type I XPVAc adhesive is used as an adherent coating to coat a wood or wood composite material which will be used for outdoor applications. This new concept mainly takes the advantages of XPVAc's characteristics of 1) uniform film-forming feature, 2) durable bonding to wood, 3) excellent resistance to water, UV light, and oxidation, and 4) fast drying/curing speed at ambient temperatures compared with most wood paints commercially available from the market.

When an adhesive is used as an adherent coating for a structural material, its functions have totally changed: 1) although its one adherent phase bonds to the substrate (which is necessary for a coating), the resin must form a free and continuous film on a substrate like wood with the other adherent phase without bonding, 2) this film only seals the exterior surface of the substrate, 3) this film must be exposed to the natural atmosphere through its nonbonding phase to work as a protective layer for the substrate, and 4) unlike an adhesive, this adherent coating does not act as a stress transfer between/among the adherends or the substrate elements.

XPVAc inherits the good filming feature of regular PVAc, which is critical to form a uniform water barrier on wood. The water resistance and durability of XPVAc coating significantly depend on the crosslinking or grafting efficiency of XPVAc (i.e., the percentage of crosslinked PVAc amount to the total PVAc amount) and the bonding quality and toughness with the wood substrate, which is reflected by the wet shear strength of XPVAc at the coating and wood interface. Moreover, this new coating material must exceed a minimum wet bonding strength on wood in order to maintain an effective water resistance and durability of the coated wood product for outdoor exposure.

Different from the commercially available coating materials, an XPVAc coating has a bi-functional feature: It not only can be used as a primer for most wood substrates, but it also works as a top coat material for wood and wood composites. Furthermore, a cured XPVAc coating is compatible with latex, acrylic, alkyd, urethane, epoxy, and other wood paints.

The interior layer of an XPVAc coating can be treated as a primer for a two-layer XPVAc coating structure. Moreover, the combination of an XPVAc primer and an acrylic or alkyd top coat can provide an enhanced water resistance and durability for wood and wood composites. Therefore, these coating layer structures are suitable for outdoor exposure and provide an excellent protection to the coated wood and wood composite products.

BRIEF DESCRIPTION OF THE DRAWING

FIG. 1 shows the flow chart of the XPVAc coating processes for wood and wood composites.

DETAILED DESCRIPTION OF THE INVENTION

The present invention relates to the use of XPVAc adhesives as a coating material to improve the water resistance and durability of coated wood and wood composites. XPVAc is a two-part adhesive, in which the polyvinyl acetate emulsion is the main part, while the other part is the catalyst. It can also be a one-part adhesive, in which the catalyst is already premixed. However, the former may provide better wet strength than the latter. By adding a catalyst into the emulsion, a crosslinking agent may react with polyvinyl acetate, polyvinyl alcohol, and monomer vinyl acetate molecules at an ambient or heat condition to form a network structure of crosslinked molecular chains. The curing of crosslinking polyvinyl acetate is driven by a loss of moisture in the emulsion and/or when the moisture is dried out. The solid content of most commercially available crosslinking polyvinyl acetates may be in a range from about 40 to 60% by weight.

Based on its performance and durability, XPVAc can also be divided into Type I and Type II adhesives. Type I adhesives are excellent in water resistance and can be used in an exterior atmosphere, but they are not waterproof, while a type II adhesive can withstand water contact for a short time and would not lose its bonding performance at room conditions. However, Type II adhesives should not be used in outdoor conditions.

XPVAc may include a catalyst, which may promote chemical reaction and increase crosslinking of the material. Different catalysts may be utilized to accelerate the crosslinking reaction for XPVAc. Among them, the most popular catalysts for XPVAc may be a group of metal ion compounds including chromium nitrate, aluminum nitrate, aluminum chloride, iron trichloride, zirconium nitrate [$Zr(NO_3)_4$], potassium bichromate, or the like. With the same resin formula, XPVAc film initiated by chromium nitrate is normally better in water resistance and durability than that initiated by aluminum chloride due to the higher crosslinking efficiency of chromium nitrate, while the water resistance and durability of XPVAc initiated by aluminum nitrate may be between those by chromium nitrate and aluminum chloride.

A suitable crosslinking agent for XPVAc is normally a bi-functional compound, which may include acrylic acid (AA), oxalic acid, glyoxal, dialdehyde glyoxal, glutaraldehyde, acrylonitrile (AN), n-butyl acrylate (BA), vinyl butyrate (VB), vinyl chloride, acetoacetoxy ether methacrylate (AAEM), diacetone acrylamide, 4-hydroxybutyl acrylate, 4-hydroxybutyl acrylate glycidylether, hexakis-(methoxymethyl)-melamine (HMMM), isopropylene alcohol, 2-hydroxyethyl acrylate, glycidyl methacrylate, methyl methacrylate (MMA), N-isobutylmethylol acrylamide (NIBMA), N-methylol acrylamide (NMA), natural rubber latex, versate acid Veo Va-9 or VV 9 ($CH_2$=$CHOOCCR_3R_1R_2$) and Veo Va-10 or VV10, and the like.

In some embodiments, suitable crosslinking agents may also be a mixture of vinyl acetate (VAc) with the above crosslinking agents to form a copolymer such as VAc/BA, VAc/MMA, VAc/AAEM, VAc/NIBMA, VAc/NMA, VAc/Veo Va-9, VAc/Veo Va-10, VAc/AA/AN, and the like. Other possible crosslinking agents with a similar structure may be the products of vinyl acetate and other monomers, including VAc/ethylene, VAc/2-ethylhexyl acrylate, VAc/polyethylene glycol dimethacrylate, and the like. The resultant crosslinking agents can help improve the water resistance of XPVAc.

In some embodiments, suitable crosslinking agents may also include butyl and methyl acrylate esters for the vinyl acetate/butyl acrylate monomer. They may be the copolymers of vinyl ester and VeoVa-10, including VeoVa-10/methyl methacrylate and VeoVa-10/methyl methacrylate/2-ethylhexylacrylate.

Some suitable crosslinking agents may be an organic silicone compound such as alkoxysilane, dimethylsiloxane, halogensilane, halogenethylsilane, halogenmethylsilane, halogenmethyl-phenylsilane, polymethylphenysilane, vinyl-trimethoxysilane (A-171), methacryloxypropyl-trimethoxysilane (A-174NT), vinyltriisopropyloxysilane (A-1706), Methacryloxypropyl-tris-(2-propoxy)silane (A-1757), and the like. In addition, the above organic silicones can form a copolymer with VAc, respectively. The resultant copolymers can be used as a new crosslinking agent for XPVAc.

In some embodiments, suitable crosslinking agents may include adhesives which are normally called external crosslinking agents. They may include aliphatic polyester-phenol formaldehyde (APPF), emulsion polymer isocyanate (EPI), furfuryl alcohol-modified urea formaldehyde (FAUA), MF, MUF, PF, polyester, polymeric diphenylmethane diisocyanate (pMDI), polyisocyanate, UF, and the like. For example, crosslinking polyvinyl acetate itself may be or otherwise include a two-part emulsified phenolic or melamine polyvinyl acetate. The use of phenol or melamine formaldehyde in the emulsified polyvinyl acetate may help improve the thermal resistance of XPVAc. Other suitable crosslinking agents may be the mixtures of epoxy with MF, carbamide formaldehyde, and/or furol formaldehyde.

In some embodiments, XPVAc may include EPI, which may use a 10 to 20% by weight iscocyanate catalyst such as methylene diphenyl diisocyanate (MDI), hexamethylene diisocyanate (HDI), toluene diisocyanate (TDI), isophorone diisocyanate (IPDI), naphthalene diisocyanate (NDI), or the like.

XPVAc may include 10% or less by weight of the catalyst, or about 2-8% by weight of the catalyst, or about 4-6% by weight of the catalyst, while XPVAc may contain about 10 to 50% by weight of the crosslinking agent, or about 20 to 25% by weight of the crosslinking agent, or about 35 to 40% by weight of the crosslinking agent.

In some embodiments, a surfactant or stabilizer may be added into the XPVAc adherent coating to stabilize the coating system and avoid the hydrolysis of PVAc emulsion adhesive. The suitable surfactants for PVAc may include nonionic and anionic surfactants. The nonionic surfactants may include cetomacrogol 1000, cetostearyl alcohol, cetyl alcohol, decyl glucoside, isoceteth-20, monolaurin, nonidet P-40, nonoxynol, oleyl alcohol, Pluronic F108, poloxamer, polysorbate, sorbitan tristearate, stearyl alcohol, Triton X-100, Tween 80, or the like.

In some embodiments, the anionic surfactants may include sodium dodecyl sulfate (SDS), ammonium lauryl sulfate, sodium laureth ether sulfate (SLES), sodium myreth sulfate, dioctyl sodium sulfosuccinate, perfluorooctanesulfonate (PFOS), alkyl-aryl ether phosphate, alkyl ether phosphate, and the like. Some carboxylate-based anionic surfactants are also included such as sodium stearate, sodium lauroyl sarcosinate, perfluorononanoate (PFOA), perfluorooctanoate (PFO), and the like.

In at least some embodiments, a surfactant polymer or a surfactant-containing polymer may be used as a stabilizer for XPVAc, including unmodified PVA (e.g., Mowiol 6-98, Mowiol 10-98, Mowiol 28-99, and Mowiol 56-98), acetoacetoxy-functional polymers such as polymeric (polyamino) enamine (PPAE), acetoacetylated PVA polymers (also called Z-polymers, e.g., Z-100 and Z-200), and carboxylated PVA polymers (e.g., T330H), and the like.

XPVAc may also include a relatively small amount of other additives. For example, a mildewcide, fungicide, and/or insecticide such as 3-Iodo-2 propynyl butyl carbamate, 2 (thiocyanomethylthio) benzothiazole/methylenebis-thiocyanate, 3-iodo-2-propynyl butyl carbamate/chlorpyrifos, alkyl dimethyl benzyl ammonium chloride, alkyl dimethyl ethylbenzyl ammonium chloride, ammonia-zinc oxide, azaconazole, bis(tri-N-butyltin oxide)/quaternary amine, coco imidazoline benzyl chloride, copper naphthenate, copper-8-quinolinolate, copper triazole, cypermethrin, deltamethrin, dialkyldimethyl ammonium chloride, didecyl dimethyl ammonium chloride, didecyl dimethyl ammonium chloride/3-iodo-2-propynyl butyl carbamate, imidacloprid, permetrin, propiconazole, sodium pentachlorophenate, tebuconazole, zinc chloride, zinc oxide, or the like may be included (e.g., about 0.2-10% or about 1-4% or so by weight) in XPVAc.

A colorant or pigment may also be added to XPVAc coating (e.g., about 0.05-4% or about 0.5-2% or so) such as carbon black (commercially available from Evonik Industries, Parsippany, N.J.), other black pigments such as SYN-OX HB-1034 and/or HB-1094 (commercially available from Hoover Color, Hiwassee, Va.), or the like may also be added to XPVAc coating. Other colorants that may be utilized may include those commercially available from BASF (Florham Park, N.J.), including CIBA CROMOPHTAL Blue 4GNP, CROMOPHTAL Brown 5R, CROMOPHTAL Red 2020, CROMOPHTAL DPP Red BOC, CROMOPHTAL Pink PT, IRGALITE Green GFNP, IRGALITE Blue BLPO, IRGALITE Black 2B-LN, IRGALITE Red D, IRGALITE Rubine D, IRGALITE Yellow D, or the like.

As aforementioned, a coating material is totally different from an adhesive in function. The former only covers the outer surface of wood to provide a protection, while the latter bonds two adherends together to transfer the stress for a wood structural material. In most situations an adhesive stays within the substrate or between the substrate units/elements instead of the surface area. Another primary difference is that a structural adhesive is usually cured under a high pressure and a high temperature to accelerate its curing to be within minutes, while a coating material is normally dried out at room temperature for hours or days.

In some embodiments, XPVAc coating may be a singular layer of material or may include more than one layer. As a Type I adhesive, XPVAc coating not only uses its adherent feature to make a good bond with wood and wood composites, but it also seals the wood substrate and acts as a water barrier during outdoor exposure. For example, XPVAc coating may be a single layer on wood. Alternatively, XPVAc coating may include two or more layers. Each layer may have a dry thickness of about 0.001 to 0.010 inches or about 0.003 to 0.005. Alternatively, the total dry thickness of the two or more layers may be about 0.001 to 0.010 inches or about 0.003 to 0.005. In at least some embodiments, at least one more additional layer of other water resistant coating materials may be applied on the XPVAc coating. For example, a layer of acrylic paint may be added on the XPVAc coating. In some embodiments, the layer of acrylics may be applied to a single layer of XPVAc, while in other embodiments the layer of acrylics may be applied to two or more layers of XPVAc. An example of suitable acrylic paint is Sherwin-Williams acrylic A-100 paint, commercially available from Sherwin-Williams, Cleveland, Ohio.

The use of XPVAc adhesives as a coating may be desirable for a number of reasons. For example, XPVAc is a water-based material that can be utilized without the need for harsh organic solvents. Accordingly, the use of crosslinking polyvinyl acetate for XPVAc coating may allow wood composites (and/or the process of manufacturing wood composites) to be more environmentally friendly compared with oil-based coating/painting materials.

Furthermore, XPVAc coating may be applied to wood composites at room temperature. This allows the manufacturing process to be simplified or otherwise performed without the need for various heating steps or high temperature application conditions that may be required, for example, if hot melt materials were used. Alternatively, if heating steps are utilized, the heating may be attenuated (e.g., a relatively small increase in temperature) in comparison to the heating required through the use of other materials.

XPVAc may be a commercially available crosslinking PVAc adhesive such as Adhpro 30224 (Adhpro Adhesives Inc., Magog, Quebec, Canada), Adhpro 30529 (Adhpro Adhesives Inc., Magog, Quebec, Canada), Adhpro 30530 (Adhpro AdhesivesInc., Magog, Quebec, Canada), CL-1809HV (National Casein Company, Chicago, Ill.), Helmibond 805 (Helmitin, Inc., Oliver Branch, MS), Multibond SK-8 (Franklin International, Columbus, Ohio), Mowlith 2440 (Coatings & Resins International Ltd, Auckland, New Zealand), Multibond 2000 (Franklin International, Columbus, Ohio), PC-2002 (National Casein Company, Chicago, Ill.), Racal 2375 (Coatings & Resins International Ltd, Auckland, New Zealand), Wonderbond WB-957 (Momemtive, Columbus, Ohio), Wonderbond XB-90MI (Momemtive, Columbus, Ohio), WP-2200 (National Casein Company, Chicago, Ill.), and the like.

FIG. 1 illustrates some examples of methods for coating wood and wood composites. Prior to coating, putty sealing may be conducted for wood and wood composites before coating. Some wood defects such as gouges, pin holes, cracking, dead knots, and the like may exist on the surfaces and edges of a wood material. These defects can be repaired with Bondo, a two-part polyurethane adhesive (commercially available from 3M, St. Paul, Minn.), Plastic Wood, a wood filler (commercially available from Dap Products, Inc., Baltimore, Md.), Wood Putty (commercially available from Minwax, Upper Saddle River, N.J.), and others. All the pre-fixing and sealing materials must be completely cured before applying XPVAc coating on wood.

Suitable wood species for a wood lumber or wood composite may include alder, ash, aspen, basswood, beech, birch, butter nut, cherry, chestnut, cottonwood, elm, hackberry, pecan hickory, true hickory, honeylocust, locust, magnolia, maple, oak, red oak, white oak, sassafras, sweetgum, sycamore, tanoak, tupelo, walnut, willow, yellow poplar, baldcypress, cedar, Douglas-fir, fir, hemlock, larch, pine, redwood, spruce, tamarack, and the like. The wood may also include imported species such as afrormosia, albarco, andiroba, angelin, angelique, avodire, azobe, balsa, banak, benge, bubinga, bulletwood, cativo, ceiba, courbaril, cuangare, Mexican cypress, degame, determa, ekop, goncalo alves, greenheart, hura, ilomba, ipe, iroko, jarrah, jelutong, kaneelhart, kapur, karri, kempas, keruing, lignumvitae, limba, macawood, African mahogany, true mahogany, manbarklak, manni, marishballi, merbau, mersawa, mora, oak, obeche, okoume, opepe, ovangkol, para-angelim, para-pine, pau marfim, peroba de campos, peroba rosa, pilon, Caribbean pine, ocote pine, radiata pine, piquita, primavera, purpleheart, ramin, robe, Brazilian rosewood, Indian rosewood, sande, Santa maria, sapele, sepetir, shorea (including lauan-meranti group), Spanish-cedar, sucupira, teak, tornillo, wallaba, and the like.

Prior to coating, each wood lumber or wood composite may be smoothened (e.g., using a sander, planer, or the like). In at least some embodiments, it may be desirable for wood or wood composites to have a relatively small surface roughness (e.g., 0.001-0.003 inches). In addition, the moisture content of the wood within a wood lumber or wood composite should be about 6 to 12%. This may include drying wood or wood composites (e.g., placing wood in a controlled moisture environment and/or using a suitable drying apparatus).

For the edge coating step, all four edges of a wood substrate are first coated manually by a brush or a roll or by an edge-coating machine. All coated edges (including the edges along and across the machine direction) may be blown through box fans to evaporate water in the XPVAc coating and accelerate its drying out/curing. The blowing air may also be heated up by passing through an inserted heating unit in a fan before reaching the coated surfaces. Since all the edges of the wood substrate have more open pores, gaps, and void areas than the top and bottom surfaces, this porosity makes the water in the coating easily evaporate or penetrate into wood by the capillary action, thus resulting in fast curing of the coating.

Wood and wood composites may be "preheated" prior to coating. This may include exposing wood to a heating apparatus. In at least some embodiments, a heating apparatus may be an infrared (IR) heater. The set temperature of the IR heater can be in a range of about 400 to 600° F. (e.g., the heating head of heating apparatus may have a heating density of about 10 to 100 W/in$^2$). This is just an example. While heating, a heating zone may be defined by placing a heating apparatus adjacent to wood and wood composites. For example, a heating apparatus (e.g., a heating head thereof) may be disposed approximately 0.5 to 18 inches (e.g., about 0.5 to 12 inches) away from the wood surface and define the heating zone in between. The alternative heating energy may include electrical, microwave, hot steam, solar, and the like.

In at least some embodiments, the preheating process may be a continuous process where a wood or wood composite material passes a heating apparatus with, for example, a conveyor or other supporting member. A wood material may be preheated so that the wood surface temperature reaches about 80 to 250° F., or about 80 to 180° F., or about 130 to 160° F. Preheating may occur over a suitable amount of time, which may be, for example, about 2 seconds to ten minutes or so (e.g., 1 second to two minutes or so) for wood composites to pass through the heating apparatus, depending on the heating density used. However, preheating may not be required.

A roller coater may be utilized to apply XPVAc coating onto either the top and bottom surfaces or only one surface (e.g., the surface facing to outdoors) of wood and wood composites, depending on the design and customers' requirements. XPVAc coating may be applied to wood in room conditions (e.g., at an ambient temperature). In other words, XPVAc coating need not be heated prior to or during application. The wet thickness of an XPVAc layer may be about 0.005 to 0.010 inches. The total coating amount may be controlled to be about 8-40 grams of XPVAc coating per square foot, or about 10-30 grams of XPVAc coating per square foot, or about 15-20 grams of XPVAc coating per square foot. The coating area depends on the products used. For wood composite panels, their dimension may be 2' (2 ft.) by 2', 2' by 4', 4' by 4', 3' by 6', 5' by 5', 4' by 6', 4' by 8', 5' by 7', and so on, while the dimension of solid lumber beams may be 2" (2 inches) by 4", 2" by 6", 4" by 4" and 4" by 6" and the like. For solid lumber panels such as cedar and Douglas fir panels, their width can depend on the width of sawn lumbers, which may be in a range between 1" and 18" in width. Hence, the length of a roller coater can be 2' to 5', depending on the product width required by customers.

Following the application of XPVAc coating, wood may be again heated within another heating zone/tunnel with a suitable heating apparatus, similar to the aforementioned preheating process. A stationary drying process may be suitable for this heating step, while continuous IR heating may help rapidly evaporate any volatile parts of coating. The setup of IR heating for XPVAc coating can be referenced to the aforementioned preheating process. For example, the temperature of the IR heater can be set in a range of about 400 to 600° F. Similarly to the preheating procedure, the surface temperature of the XPVAc coating may be in a range between 80 and 250° F. The heating/curing time may need to be about 1 to 7 minutes for each coating layer, depending on the heat density and heating efficiency of the heating apparatus used. The speed of conveyor while wood composites are in the curing tunnel may be set so that the coating reaches a curing rate of about 80% or more before the coated wood material exits the heating zone. The total heating/curing time for two XPVAc coating layers may be about 5 to 15 minutes.

During heating, a set of fans or a ventilation system may be used to remove the moisture from XPVAc coating. They may accelerate the evaporation of moisture in the wet coating and result in a uniform film on wood and wood composites. In at least some embodiments, the heating temperature, heating distance and surface temperature of XPVAc coating may be appropriately adjusted, as needed. Furthermore, the fans may be used to avoid overheating or surface burning during the heating process either underneath or adjacent to the heating chamber of a heating apparatus to improve heat circulation at the surface of wood and wood composites. The air circulation direction (e.g., the orientation of the fans) can be vertical or horizontal relative to the coated surface of wood and wood composites. Air circulation over and across the coated surface of wood and wood composites (e.g. horizontally oriented air circulation) may also help dry wood and wood composites, which may also be desirable. The hot surface of the coated wood and wood composites after exiting from the tunnel may help evaporate the moisture of the XPVAc coating and increase its curing speed.

During heating, a multiple-level storage platform with an automatic feeding and releasing system may be used to improve the heating and production efficiency. At each level, individual heating apparatus and a set of moisture removing fans are used. The drying mode can be used by the "first comes and first leaves" or the "all in one step" procedure, depending upon the required daily production quantity. For a productive unit with a small capacity, an estimated 800 to 1,000 pieces of 4' by 8' by ¾" coated wood composites may be produced per shift per day.

The second layer/coat of XPVAc may be applied over the first layer by using another roller coater with the same amount. The wet coating then passes the second IR heating tunnel. The heating temperature, heating time, and distance between the heating chamber and the wet coating as well as other parameters are referenced to the first heating process. For a hybrid coating system of XPVAc with other water resistant coatings, the second coating process may be optional. With XPVAc being coated as the first layer, the coated wood and wood composites can be sold as a one-layer coating product which can be further coated with acrylic or alkyd manually by customers. In some embodiments, the adhesive spreaders with roller coaters in the first and second layer coating processes may be replaced by spray coating, brush coating, extrusion coating, or curtain coating machines to apply XPVAc coating to a wood substrate.

Coated wood and wood composite products may also be assessed for quality control to determine whether or not the desired thickness of XPVAc coating is disposed on wood composites. This may include the use of a suitable measuring tool or coating gauge. For example, it may be desirable for XPVAc coating to have a dry thickness of about 0.001-0.010 inches (e.g., about 0.003-0.005 inches). After the first layer of XPVAc is dried out, a second layer of XPVAc coating may be applied. In contrast to a "single layer" of XPVAc coating, it can be appreciated that the coated wood materials may also include a second layer (e.g., XPVAc coating) or otherwise include a plurality of coating layers.

For the post treatment process, the coated wood and wood composites may be further disposed in a hot press (e.g., a radio frequency hot press). In the press, XPVAc coating may be heated at 80 to 250° F. (the heating temperature must less than the softening temperature of XPVC in order to avoid any platen sticking issue by XPVAc) while applying a pressure of about 10 to 200 psi (e.g., about 10 to 160 psi, or about 80 to 120 psi) to cure XPVAc coating. The curing time may be about 30 seconds to 5 minutes (e.g., about 30 seconds to 2 minutes) within the press (which may almost completely cure XPVAc coating). Alternatively, XPVAc coating can be continuously cured with a set of heated rollers, on which the surface temperature can be in a ranges between 80 and 250° F. Coated panels may continuously pass these hot rollers under a pressure of about 10 to 200 pounds per inch. According to our test, the post treatment helps increase the bonding strength of XPVAc coating with the wood substrate by about 7 to 15%. The coated surface can be flat, embossing or debossing. The last two images and designs may be created by a pair of compression rolls with an embossing (e.g., wood grains) or debossing pattern for a decorative effect.

In at least some embodiment, a wood lumber or wood composite may enter a temporary storage station after the post treatment process. A set of fans may cool down the coated wood and wood composites. The cooling also helps accelerate the further curing/hardening of XPVAc. The cooling stage may take place over any suitable amount of time such as about 20 minutes. When suitably fanned, the coated wood and wood composites may be stacked and/or stored in a suitable storage facility and when appropriate may be packaged for shipping on a truck.

The above procedures can be modified in a number of ways including ways that may improve the process for the production of coated wood products. For example, one or more steps can be omitted and/or some of the steps can be rearranged to best suit the overall cost, production and coating durability of a given project. In one example embodiment, coated wood composites can be heated initially with heating apparatus and then sprayed with the XPVAc coating material with a sprayer. The resultant floorboards with XPVAc coating may be packed after drying. In another embodiment, only a single layer of XPVAc coating may be applied to wood and wood composites and the curing process may be accelerated with a hot press or at room conditions. The cured XPVAc coating can be further coated with acrylic coating. The first layer must be a crosslinking polyvinyl acetate, while the exterior layer may be the same coating, or alkyd coating, or acrylic coating, respectively. For certain conditions, the first two layers can be only XPVAc and then alkyd, acrylic, or urethane can be applied to form multiple layers. As indicated above, colorants (or pigments), mildewcides, fungicides, insecticides, and the like can be added to XPVAc coating to improve its aesthetic appearance and exterior performance.

During outdoor exposure, an existing topcoat of XPVAc, acrylic, or alkyd can be repainted with a new layer of the same coating. Alternatively, the existing topcoat can be slightly sanded with sandpaper and rinsed with water or a cleaning agent. After the topcoat is dried out, a new layer of the same coating is added on it. Also, an aged area of the existing double or hybrid XPVAc coating can be repaired as needed like a regular wood paint. Firstly, the aged topcoat and XPVAc primer on a wood lumber or wood composite can be removed with a portable orbit/sheet sander. A new XPVAc primer is then applied on the clean and dry wood surface. After the new primer is completely cured, the second layer of the same topcoat can be applied. A multiple layer of the same coating can be further added.

During outdoor exposure, XPVAc-coated wood and wood products are not only placed horizontally by facing upwards or downwards, but they are also installed vertically facing the outside or inside of houses, dwellings, and other buildings. The XPVAc coated wood surface may be tilted horizontally or vertically to improve its water draining ability.

In at least some embodiments, XPVAc-coated wood and wood composites are recommended to be used above the ground. The XPVAc coating itself must not be in direct contact with soil in order to avoid any possible degradation and damage of the coating.

EXAMPLES

XPVAc coatings used for this invention must be a Type I adhesive. The invention may be further clarified by reference to the following examples, which serve to exemplify some of the preferred embodiments, but not to limit the invention in any way.

Example 1

Coating Formula

As shown in Formula 1, the primary components of XPVAc coating are a PVAc resin and a catalyst. In Formula 2, carbon black (commercially available from Evonic, Parsippany, N.J.) is added into the PVAc emulsion coating before mixing with the catalyst. In Formula 3, a fungicide, 3-Iodo-2 propynyl butyl carbamate (commercially available from Dow Chemical, Midland, Mich.) can be added into PVAc before mixing to improve its fungal and mold resistances. For Formula 4, both carbon black and the fungicide are added into PVAc.

| Formula 1 | |
|---|---|
| Polyvinyl acetate (PVAc) | 100 parts |
| Chromium nitrate | 6 parts |
| Formula 2 | |
| Polyvinyl acetate (PVAc) | 100 parts |
| Chromium nitrate | 6 parts |
| Carbon black | 0.5 part |
| Formula 3 | |
| Polyvinyl acetate (PVAc) | 100 parts |
| Chromium nitrate | 6 parts |
| 3-Iodo-2 propynyl butyl carbamate (based on the total weight of the coating) | 2 parts |
| Formula 4 | |
| Polyvinyl acetate (PVAc) | 100 parts |
| Chromium nitrate | 6 parts |
| Carbon black | 0.5 part |
| 3-Iodo-2 propynyl butyl carbamate (based on the total weight of the coating) | 2 parts |

Example 2

Coating Layer Structures

In order to maintain optimum outdoor performance, the XPVAc coating must be coated as the first layer on wood (i.e., the primer). For this invention, this new coating system may have at least two layers in structure during the outdoor service. It may include the following coating structures:

| Coating layer structure 1 | |
|---|---|
| XPVAc | 2nd layer (or the exterior layer) |
| XPVAc | 1st layer (or the primer layer which contacts wood) |
| Coating layer structure 2 | |
| Acrylic (100%) | 2nd layer (or the exterior layer) |
| XPVAc | 1st layer (or the primer layer) |
| Coating layer structure 3 | |
| Alkyd | 2nd layer (or the exterior layer) |
| XPVAc | 1st layer (or the primer layer) |
| Coating layer structure 4 | |
| Polyurethane | 2nd layer (or the exterior layer) |
| XPVAc | 1st layer (or the primer layer) |

For the above hybrid coating structures, the XPVAc primer is coated on wood and wood composites by a coating factory, while the second and third layer can be applied by customer with a regular wood paint such as acrylic, alkyd or urethane. Moreover, the customers can further add the third/exterior hybrid coating layer on the above double-layer XPVAc coating.

Example 3

XPVAc Coatings Suitable for Outdoor Exposure

As aforementioned, a Type I PVAc adhesive is excellent in water resistance, but it is not waterproof. According to the ASTM standard D4317, Type I PVAc-based emulsion adhesives must pass a two-cycle boiling test, in which a number of plywood specimens are prepared. After the two-cycle boil, the minimum wet shear strength must exceed a criterion that contains three strength groups varying from 250 to 350 psi with different specimen number and wood failure requirements. However, ASTM D4317 may not be robust enough to meet the exterior exposure requirement for Type I PVAc adhesive-bonded wood and wood composites which have open or facing up glue lines.

In this invention, the Fruehauf industry standard is used to screen out unqualified XPVAc coatings for outdoor exposure. By this screening method, oak or hard maple (e.g., sugar maple) strips with a cross-section dimension of 1" by 1 ½" are used for the Fruehauf shear test. For this invention, an XPVAc adhesive was evenly coated on the bonding surface of each hardwood strip. The adhesive amount at the glue line was controlled to be 70-80 lbs./1,000 ft$^2$. Every two coated strips were contacted together at their coating surfaces and the glue line was closed for about 5 minutes. They were then placed on an assembler and tightened with pipe clamps under a pressure of about 150 psi overnight. The resultant laminated two-strip boards were released from the assembler and stored at the room conditions for 24 hrs. Alternatively, a lab press can be used for the above sample preparation. Finally, the laminated strip boards were cut into 2 inch-long shear blocks by a table saw.

In accordance with the Fruehauf standard, dry and wet shear tests were conducted with a universal test machine, respectively. For the wet shear test, the shear blocks followed a two-cycle procedure of water soaking and oven-drying for four days. They were first submerged into water for 48 hrs. at room temperature and placed at least one inch below the water level. After being soaked, the wet samples were dried in a lab oven at 140° F. for 8 hrs. and then soaked again in water for 16 hrs. For the second cycle, all samples repeated the procedure of 8 hr.-drying and 16 hr.-soaking After that, the wet shear blocks were instantly tested with a shear device mounted on the universal test machine. The testing data was recorded and reported. According to this standard, a PVAc adhesive must exceed 525 psi in wet shear strength in order to meet the requirement for outdoor applications.

Most of the commercially available XPVAc adhesives are different in formulation. They vary in the weight ratios of the ingredients used and the molecular weight of PVAc and PVA. They also use different catalysts, crosslinking agents, and additives. As aforementioned, the bonding durability of XPVAc adhesives are significantly affected by the crosslinking efficiency of the adhesive polymer chains and the bonding toughness with wood, which can be evaluated by the Fruehauf wet shear strength at the glue lines. As shown in Table 1, Type II XPVAc adhesives cannot meet the requirement for outdoor applications. Some Type I XPVAc adhesives such as Franklin International's Titebond III and Momentive's XB-90MI listed in Table 1 do not provide a satisfactory performance. However, other Type I XPVAc adhesives such as Franklin International's Deckbond LS adhesive and Deckbond LS coating both exceeded the wet shear strength required by the Fruehauf standard. Since most commercially available XPVAc adhesives cannot exceed the minimum wet shear strength of 525 psi, they are not suitable for outdoor exposure.

TABLE 1

Bonding performances of different XPVAc adhesives

| Adhesive sample | Adhesive type | Sample quantity | Nominal width (in) | Nominal length (in) | Wet shear strength (psi) |
|---|---|---|---|---|---|
| Titebond II | Type II | 15 | 1.44 | 2 | 278 |
| Titebond III | Type I | 15 | 1.44 | 2 | 405 |
| XB-90MI | Type I | 15 | 1.44 | 2 | 422 |
| Deckbond LS | Type I | 15 | 1.44 | 2 | 818 |
| Deckbond LS coating | Type I | 15 | 1.44 | 2 | 724 |

Northern red oak strips were used for the above shear test blocks. Deckbond LS coating is the formula in which carbon black is added as colorant in the adhesive.

For this invention, however, XPVAc adhesives are used as a coating material for wood and wood composites. The bonding requirement for XPVAc coatings is different from that for XPVAc adhesives. Since there is no load carrying/bearing requirement for XPVAc coatings, they can have a lower bonding strength than XPVAc adhesives. Based on our experiments, Type I XPVAc adhesives which have a Fruehauf wet shear strength range between 325 and 525 psi can be used as adherent coatings for outdoor exposure, but they must be used as a primer and combine with acrylic, alkyd, and other water resistant paints (see Coating layer structure #2 to #4 in Example 2). In contrast, Type I XPAVc coatings used as a topcoat in the first coating layer structure must exceed 525 psi in wet shear strength when they expose to the outdoor atmosphere.

The service life of Type I XPVAc coatings can be improved by repainting the existing XPVAc coatings several times during outdoor exposure. For instance, the top layer of the above hybrid coating structures needs to be repainted with the same paint for every three to five years when XPVAc is used as a primer, whereas the exterior layer of the double XPVA coating structure may be repainted for every five to seven years. In addition, the repainting intervals for XPVAc with a Fruehauf wet shear strength of over 525 psi in the above hybrid coating structures can be longer than those for XPVAc with a Fruehauf wet shear strength range between 325 and 525 psi. Alternatively, the double XPVAc coating structure can be repainted with acrylic, alkyd, or other water resistant paints. The resultant multiple layer coating may have longer repainting intervals. Moreover, all the above coating structures can wait longer for the repainting schedule when they are in a fully or partially protected location such as siding, sheathing, decking, window frames, eave sections, and so on. By estimation, the service life of the Type I XPVAc-based coating systems may be up to thirty years after being repainted several times.

Example 4

Thickness Swelling Rate After Outdoor Exposure

Two layers of the coating from Formula 1 and 2 in Example 1 were applied to 6" by 6" plywood, particleboard, and OSB samples, respectively, which had the coating layer structure 1 in Example 2. Each coated sample was sealed with two coating layers of XPVAc. The coated samples were then placed in room conditions for one week before the outdoor exposure.

All plywood and OSB samples were mounted on outdoor shelves and exposed in an outside Minnesota environment. The topcoat of each test sample was faced up and vertically fastened on racks of a tilted shelf stand during testing. There was a marked dot at each edge center of all samples. The thickness at each marked dot of all the test samples was measured with a digital caliper. After being exposed outdoor, the thickness at each edge center was measured again in an interval of 4, 13, and 18 months, respectively. The exposed thickness at each edge of the uncoated and coated samples was then compared with the original thickness before the outdoor exposure. For all the coated test samples, the thickness swelling rate (TSR) at each interval was calculated. For this invention, TSR is equal to the difference between the thickness at a specified interval and the original thickness divided by the original thickness.

TABLE 2

Thickness swelling rate of plywood for outdoor exposure

| Board sample | Wood species | Adhesive type | Coating used | Coating layer | Width (inch) | Length (inch) | Thickness (inch) | Thickness swelling rate (%) | | |
|---|---|---|---|---|---|---|---|---|---|---|
| | | | | | | | | 4 Mon | 13 Mon | 18 Mon |
| Control#1 | Birch | UF | None | 0 | 6 | 6 | 0.194 | 12.2 | 29.3 | DL |
| XPVAc#1 | Birch | UF | DBLS | 2 | 6 | 6 | 0.518 | 1.2 | 2.7 | 1.4 |
| XPVAc#2 | Birch | UF | DBLS | 2 | 6 | 6 | 0.519 | 1.0 | 2.0 | 3.2 |

UF: Urea formaldehyde; DBLS: Deckbond LS coating; Mon: Months; DL: Delamination.

XPVAc#1 and #2 used the catalyst of chromium nitrate and aluminum chloride, respectively.

TABLE 3

Thickness swelling rate of OSB and particleboards for outdoor exposure

| Board sample | Board type | Adhesive type | Coating used | Coating layer | Width (inch) | Length (inch) | Thickness (inch) | Thickness swelling rate (%) | | |
|---|---|---|---|---|---|---|---|---|---|---|
| | | | | | | | | 4 Mon | 13 Mon | 18 Mon |
| Control#1 | PB | PF | None | 0 | 6 | 6 | 0.734 | 38.0 | 18.2 | 29.2 |
| XPVAc#1a | PB | PF | DBLS | 2 | 6 | 6 | 0.745 | 1.9 | 5.4 | 5.6 |
| XPVAc#1b | PB | PF | DBLS | 2 | 6 | 6 | 0.736 | 4.0 | 5.8 | 7.9 |
| Control#2 | OSB | PF | None | 0 | 6 | 6 | 0.551 | 6.9 | 10.3 | 13.5 |
| XPVAc#2 | OSB | PF | DBLS | 2 | 6 | 6 | 0.590 | −1.3 | −0.6 | 0.3 |
| Control#3 | OSB | PF | None | 0 | 6 | 6 | 0.774 | 9.9 | 9.6 | 11.8 |
| XPVAc#3 | OSB | PF | DBLS | 2 | 6 | 6 | 0.781 | 0.2 | 1.8 | 0.8 |

OSB: Oriented strand boards; DBLS: Deckbond LS coating; Mon: Months; PB: Particleboards; PF: Phenol formaldehyde.
XPVAc#1b used the catalyst of aluminum chloride while the rest coatings used chromium nitrate.

The testing results are summarized in Tables 2 and 3. As shown in these two tables, XPVAc-coated plywood, particleboard, and OSB samples had a lower TSR value and better dimensional stability than the uncoated samples after 18-month exposure. In addition, all the XPVAc coatings were intact and had no cracking and peeling off after 18-month exposure. In contrast, all the uncoated plywood samples were delaminated and separated into layers within the exposure period of less than one year. All the uncoated particleboard and OSB samples had a large swelling at four corners. Layer separation or delamination around the corner areas was seen for most of the uncoated particleboard and OSB samples after 18-month exposure.

Example 5

Outdoor Performance of XPVAc-Coated Wood and Wood Composites

Test sample boards were made that included the coatings from Formula 1 and 2 in Example 1 (one layer or two layers of the coating), along with the first or exterior layer of the coatings from latex paint (Daubert TECTYL 2500, commercially available from Daubert Chemical Company, Chicago, Ill.) and acrylic paint (A-100, commercially available from Sherwin Williams, Cleveland, Ohio), respectively. The uncoated samples and the sample boards coated only with latex and acrylic paints, respectively, were used as a control. During the field test, all sample boards were placed in an outside Minnesota environment. During the test, the sample boards were placed horizontally on wood frames and 4" to 10" above the ground. They were also tilted with an angle of about 10 to 15° in order to help drain moisture and rain away the coating. The coated surfaces (if present) were arranged "face up".

In the first test group, the sample floor boards were simply placed on the racks, while the sample floor boards were fastened to the racks by screws in the second test group. As shown in Table 4, XPVAc with one and two coating layers on wood both lasted longer than the corresponding latex and acrylic paints with two coating layers. Latex and acrylic paints showed peeling off only within two-year exposure. XPVAc with one coating layer did not show any cracking until three-year exposure, while XPVAc with two coating layers was intact even after four-year exposure.

Accordingly, the above results indicate that all sample boards coated with the coatings from Examples 2 with two coating layers of XPVAc or with the exterior layer of acrylic or alkyd have showed the enhanced durability (including resistance to delamination) and weather resistance.

Example 6

Potential Applications for XPVAc Coated Wood Products

Due to their excellent water resistance and enhanced durability, XPVAc-coated wood and wood composites can be used for many outdoor or water resistant applications as below:

TABLE 4

Outdoor performance of different coatings for wood materials

| Sample | Species | Dimension | Coating used | Coating layer | Outdoor exposing period | Coating performance |
|---|---|---|---|---|---|---|
| 1. First group (Placed on the racks) | | | | | | |
| SL#1 | Maple | 12" by 22.5" | Latex/XPVAc | 2 (1$^{st}$: XPVAc and the exterior: Latex) | 5 yrs. | Small peeling off areas around some wood defects after 3 year exposure |
| SL#2 | Maple | 12" by 18.25" | Acrylic/XPVAc | 2 (1$^{st}$: XPVAc and the exterior: Acrylic) | 5 yrs. | Intact, no peeling off, and no cracking |
| OSB#1 | Mixed | 6" by 6" | None | 0 | 4 yrs. | Swollen seriously with layer separation across the thickness |
| OSB#2 | Mixed | 6" by 6" | XPVAc | 2 | 4 yrs. | Intact, no sign of peeling off, delamination, and cracking |
| 2. Second group (Fastened on the racks with screws) | | | | | | |
| SL#3 | Oak | 6" by 10" | Latex | 2 | 5 yrs. | Started peeling off after 12 month exposure. Most peeled off within 30 month exposure |

TABLE 4-continued

Outdoor performance of different coatings for wood materials

| Sample | Species | Dimension | Coating used | Coating layer | Outdoor exposing period | Coating performance |
|---|---|---|---|---|---|---|
| SL#4 | Oak | 6" by 10" | Acrylic | 2 | 5 yrs. | Started cracking after 18 month exposure. The paint had 20% peeling off |
| SL#5 | Oak | 12" by 12" | XPVAc | 1 | 4 yrs. | Started cracking after 3 year exposure |
| SL#6 | Oak | 12" by 36" | XPVAc | 2 | 4 yrs. | Intact, no cracking, no peeling |
| SL#7 | Pine | 10" by 16" | XPVAc/ Alkyd | 2 (1st: XPVAc and the exterior: Alkyd) | 1 yr. | Intact, no cracking, no peeling |

SL: Solid lumber; OSB: Phenol formaldehyde glued oriented strand board; XPVAc: DBLS coating.
OSB#1 was completely sealed with copper naphthane (Aqua-Nap 5, commercially available from Copper Care, Inc., Columbus, NE) before exposure.

Coated OSB (Bonded with PF, RF, RPF, MF, and pMDI adhesives): Roof boards, sub floors, sheathing, siding, sign/ad boards, decking, outdoor bench tops; picnic tables, anti-acoustic boards, highway guardrails, movable homes; walls and decks for RV, etc.

Coated plywood (Bonded with UF, XPVAc, and MUF adhesives): Roof boards, bench top faces; sheathing, siding, doors, windows, etc.

Coated marine plywood (Bonded with PF, RF, RPF, and MF adhesives): Roof boards, sub floors, sheathing, siding, doors, windows, sign/ad boards, picnic tables, walls and decks for RV, outdoor decking, anti-acoustic boards, movable homes, etc.

Coated flakeboards (Bonded with PF, RF, RPF, MF, and pMDI adhesives): Roof boards, sheathing, siding, sign/ad boards, decking, outdoor bench tops; picnic tables, sub floors, anti-acoustic boards, etc.

Coated hardboards: Roof boards, siding, doors, sign/ad boards, etc.

Coated cedar lumbers: Roof boards, ceilings, siding, fences, doors, windows, etc.

Coated Douglas fir lumbers: Roof boards, ceilings, siding, fences, etc.

Coated laminated veneer lumber (LVL): Outdoor truss beams, wood bridges, floors, decking, other exterior structures, etc.

Coated laminated strand lumber (LSL): Outdoor truss beams, wood bridges, floors, decking, other exterior structures, etc.

Coated parallel strand lumber (PSL): Outdoor truss beams, wood bridges, decking, outdoor bench tops; picnic tables, anti-acoustic boards, highway guardrails, other exterior structures, etc.

Coated gypsum-wood fiber composites: Roof boards, ceilings, sheathing, siding, fences, decking, etc.

The above XPVAc-coated wood and wood composite products are herein described in certain embodiments which are used only for a presentation. The descriptions may be subject to changes, modifications, and substitutions without falling out of the spirit of this invention. The term "wood member" as used herein refers to wood or wood composite products.

This completes the description of the preferred and alternate embodiments of the invention. Those skilled in the art may recognize other equivalents to the specific embodiment described herein.

What is claimed is:

1. A waterproofing composition comprising:
   a crosslinking polyvinyl acetate polymer emulsion applied and cured as a first coating layer or a primer on an exposed exterior surface of a wood member; and
   a coating layer selected from the group consisting of acrylic, latex, alkyd, epoxy, polyurethane or urethane applied over the cured emulsion as a second coating layer or a topcoat;
   wherein said composition forms a coating film on at least a part of the exposed exterior surfaces of the wood member;
   wherein the crosslinking polyvinyl acetate polymer emulsion includes a polyvinyl acetate polymer;
   a catalyst selected from the group consisting of chromium nitrate, aluminum nitrate, aluminum chloride, iron trichloride, zirconium nitrate and potassium bichromate;
   a crosslinking agent;
   a colorant; and
   a copolymer including polyvinyl alcohol and ethylene vinyl acetate, wherein the crosslinking polyvinyl acetate polymer emulsion has a minimum Fruehauf wet shear strength of 325 psi and wherein said composition is applied as a wood coating or paint in an outdoor condition and seals the exterior surfaces of the wood member, such that said composition is free of penetration into said wood member and is on the exposed exterior surface of the wood member.

2. The waterproofing composition of claim 1, wherein said catalyst is less than or equal to 10% by weight of said crosslinking polyvinyl acetate polymer emulsion.

3. The waterproofing composition of claim 2, wherein said catalyst is between about 4% to about 6% by weight of said crosslinking polyvinyl acetate polymer emulsion.

4. The waterproofing composition of claim 1, further comprising a stabilizer or a surfactant.

5. The waterproofing composition of claim 1, wherein said colorant is carbon black.

6. The waterproofing composition of claim 1, wherein said crosslinking polyvinyl acetate polymer emulsion has a solid content of about 40% to about 60% by weight.

7. The waterproofing composition of claim 1, wherein said crosslinking polyvinyl acetate polymer emulsion has a minimum Fruehauf wet shear strength of 525 psi when applied as a top coating layer.

8. The waterproofing composition of claim 1, wherein each layer of said coating film forms a free and continuous protective layer on at least a part of the exposed exterior surface of the wood member.

9. The waterproofing composition of claim 1, wherein each layer of said coating film is applied on at least a part of the exposed exterior surface of the wood member and completely seals the coated exterior surface.

10. The waterproofing composition of claim 1, wherein said coating film is exposed to a natural atmosphere or environment of sunlight, UV light, oxidation, rain, moisture or water and protects the wood member during service.

11. The waterproofing composition of claim 1, wherein each layer of said coating film is formed on at least a part of the exposed exterior surface of the wood member and does not function as an adhesive and does not transfer stress between or among composition elements of the wood member when said wood member is subject to an external force or load.

12. The waterproofing composition of claim 1, wherein the crosslinking polyvinyl acetate polymer emulsion includes a first adherent phase which contacts at least a part of the exposed exterior surface of the wood member and bonds to the exposed exterior surface of the wood member, and a second adherent phase which is cured and does not contact or bond to the exposed exterior surface of the wood member.

13. A wood product including at least one exposed exterior surface, said exposed exterior surface receiving a protective coating composition comprising at least a first coating layer of a crosslinking polyvinyl acetate as a primer wherein said first coating layer has been cured after application and prior to contacting any other products, and further wherein the composition is used as a wood coating or paint for said product and exposed to a natural atmosphere or environment of sunlight, UV light, rain, snow, oxidation, moisture or water and the crosslinking polyvinyl acetate has a minimum Fruehauf wet shear strength of 325 psi when applied to wood and cured; and wherein the wood product is at least one of a solid wood material and a wood composite wherein said composition is free of penetration into said wood product and is on the exposed exterior surface of the wood product.

14. The wood product of claim 13, wherein said crosslinking polyvinyl acetate includes a colorant.

15. The wood product of claim 13, further comprising a second layer of crosslinking polyvinyl acetate over said first layer of crosslinking polyvinyl acetate.

16. The wood product of claim 15, wherein the second crosslinking polyvinyl acetate coating layer includes a first adherent phase which bonds with the cured first crosslinking polyvinyl acetate coating layer and a second adherent phase which is cured but does not contact or bond to the exposed exterior surface of the wood member.

17. The wood product of claim 15, wherein the second crosslinking polyvinyl acetate coating layer when used as a top coating layer includes a first adherent phase which bonds with the cured first crosslinking polyvinyl acetate coating layer and a second adherent phase which is cured but does not bond to the exposed exterior surface of the wood member or any other products or materials.

18. The wood product of claim 13, further comprising a layer of latex, acrylic, alkyd or urethane over said first coating layer of crosslinking polyvinyl acetate.

19. The wood product of claim 13, wherein the wood composite is a composition of wood elements bonded together by an adhesive.

20. The wood product of claim 19, wherein the wood composite comprises chips, fibers, flakes, lumber, particles, and veneer.

21. The wood product of claim 19, wherein the adhesive comprises urea formaldehyde, melamine formaldehyde, melamine urea formaldehyde, phenol formaldehyde, crosslinking polyvinyl acetate, resorcinol formaldehyde, resorcinol phenol formaldehyde, emulsion polymer isocyanate, and polymeric diphenylmethane diisocyanate (pMDI).

22. The wood product of claim 13, wherein the combination of the first coating layer of crosslinking polyvinyl acetate applied as a primer on said product with a coating layer selected from the group consisting of acrylic, latex, alkyd, epoxy, polyurethane, and urethane as the second coating layer applied over the cured first coating layer provides surface protection to said product and enhances the outdoor durability of said product.

23. The wood product of claim 13, wherein the crosslinking polyvinyl acetate coating has a minimum Fruehauf wet shear strength of 525 psi when used as a top coating layer to provide durable protection to said product.

* * * * *